United States Patent
Richter

(10) Patent No.: US 6,423,901 B2
(45) Date of Patent: Jul. 23, 2002

(54) GUIDING ARRANGEMENT FOR ENERGY LINES

(75) Inventor: Wolfgang Richter, Kreuztal (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 09/798,150

(22) Filed: Mar. 2, 2001

Related U.S. Application Data

(63) Continuation of application No. PCT/EP99/06184, filed on Aug. 23, 1999.

(30) Foreign Application Priority Data

Sep. 2, 1998 (DE) .......................... 198 39 966

(51) Int. Cl.7 ................................. H02G 3/00
(52) U.S. Cl. .................. 174/72 A; 174/72 R; 174/135; 174/69; 474/145
(58) Field of Search ............................ 174/72 A, 72 R, 174/69, 135; 59/78.1, 900; 248/49, 60; 474/145, 273; 191/12 C, 12 R

(56) References Cited

U.S. PATENT DOCUMENTS

| | | | |
|---|---|---|---|
| 3,330,105 A | * | 7/1967 | Weber ..................... 59/78.1 |
| 4,672,805 A | | 6/1987 | Moritz |
| 5,257,961 A | * | 11/1993 | Wehler et al. .............. 474/144 |
| 5,411,443 A | | 5/1995 | Meier et al. |
| 5,860,274 A | * | 1/1999 | Saleh et al. ................. 59/78.1 |
| 5,890,357 A | * | 4/1999 | Blase .......................... 59/78.1 |
| 6,065,278 A | * | 5/2000 | Weber et al. ............... 59/78.1 |
| 6,215,068 B1 | | 4/2001 | Meier |

FOREIGN PATENT DOCUMENTS

| | | |
|---|---|---|
| DD | 265 449 B5 | 11/1996 |
| DE | 39 14 140 A1 | 10/1990 |
| DE | 90 16 870.4 U1 | 5/1992 |
| EP | 0 490 022 A2 | 6/1992 |
| EP | 0 544 027 B1 | 6/1993 |

* cited by examiner

*Primary Examiner*—Dean A. Reichard
*Assistant Examiner*—W. David Walkenhorst
(74) *Attorney, Agent, or Firm*—Alston & Bird LLP

(57) ABSTRACT

A line guiding arrangement for supporting one or more energy lines or conduits, which includes two substantially parallel strands (2,3) of plastic. Each strand (2,3) is subdivided by transverse separations (5) to form the strand into flexibly interconnected segments (4). The transverse separations (5) extend transverse to the longitudinal direction of the strand (2,3), and they are formed at selected intervals between one another. The transverse separations (5) extend in a side wall portion (6) to the vicinity of a support wall portion (7). At selected intervals, the segments (4) are interconnected by crossbars (8,9), with the segments (4) and the crossbars (8,9) defining a guide channel (10) for running at least one energy line.

21 Claims, 8 Drawing Sheets

GUIDING ARRANGEMENT FOR ENERGY LINES

CROSS REFERENCE TO RELATED APPLICATION

This is a continuation of International Application No. PCT/EP99/06184, filed Aug. 23, 1999 and designating the U.S.

BACKGROUND OF THE INVENTION

The present invention relates to a plastic line guiding arrangement, for supporting at least one energy line or conduit.

For supporting energy lines between a stationary attachment point to a movable consumer load, line guiding arrangements are commonly used. At its one end, the line guiding arrangement connects to a fixed point, and its other end is connected to a movable consumer load. Line guiding arrangements are known, which are constructed from flexibly interconnected chain links. Such line guiding arrangements are referred to as energy supply line guiding chains. Each chain link comprises a receiving chamber and the receiving chambers of the individual chain links form a guide channel, in which the lines are laid. The receiving chamber is defined by two spaced-apart, oppositely arranged chain side plates, as well as by an upper and a lower crossbar. The crossbars connect to the chain side plates. To subdivide the guide channel, each chain link may comprise partitions, so as to realize both a horizontal and a vertical subdivision of the guide channel.

To run lines, DD 265 449 B5 discloses a line guiding arrangement that comprises a line receiving channel, which is defined by a support wall portion, a cover wall portion, and side wall portions. The line receiving channel is subdivided by transverse separations into a plurality of segments that are tiltable relative to one another. The transverse separations extend through the cover portion and continue in the side wall portions to at least the vicinity of the support wall portion.

EP 0 544 027 B1 discloses a further configuration of a line guiding arrangement, which serves to support at least one line that is laid in a line receiving channel. The line receiving channel comprises a support wall portion, a cover portion, and side wall portions. Transverse separations subdivide the line receiving channel into a plurality of segments that are tiltable relative to one another, so that the line guiding arrangement can be deflected while forming a first half and a second half extending parallel thereto as well as a looplike transition between the two halves. The transverse separations extend through the cover portion, and they continue in the side wall portions to at least the vicinity of the support wall portion.

Lines that are intended to be run in a line guiding arrangement as is known from EP 0 544 027 B1, can be arranged only side by side. A subdivision of the line guide channel in a line guiding arrangement of EP 0 544 027 occurs by line partitions that extend in the longitudinal direction of the line receiving channel. Likewise, the line partitions are separated by transverse separations. The transverse separations extend through the line partitions to at least the vicinity of the support wall portion to facilitate an easy loop formation of the respective line receiving channel.

Utility Model G 90 16 870.4 discloses a further configuration of a line guiding arrangement. This line guiding arrangement comprises a line bundling device by which the lines are held together. The outside of the line bundling device mounts sliding devices with a good sliding ability. The sliding devices prevent friction between the line bundling device.

Line guiding arrangements as disclosed in DD 265 449 B5 or EP 0 544 027 B1 are made by extruding a section of a plastic, and subsequently cutting it by means of a suitable tool, so that the section is subdivided into individual segments.

By subdividing the line guiding arrangement into segments, same are interconnected only by the support wall portion. This leads to a reduced stability of the line guiding arrangement. It exhibits a relatively small flexural or torsional stiffness.

Based on the foregoing, it is the object of the present invention to improve the known line guiding arrangements such that the improved arrangement provides an increased stability without reducing its capability of forming loops.

SUMMARY OF THE INVENTION

The above and other objects and advantages of the present invention are achieved by the provision of a line guiding arrangement which comprises a pair of substantially parallel strands formed preferably of plastic, and which extend in the longitudinal direction, with each strand comprising a side wall portion and a support wall portion extending along a lower edge of the side wall portion. A plurality of separations extend transversely to the longitudinal direction, i.e. vertically, at selected longitudinal intervals from one another, and with the separations extending through the side wall portion to a point adjacent the support wall portion. A plurality of flexibly interconnected segments are thus formed in each strand between the separations.

The strands are interconnected by crossbars. The crossbars connect at selected intervals to opposite segments, so that the segments and the crossbars define a guide channel for running at least one line. The crossbars as such may exhibit a relatively significant stiffness, so that the line guiding arrangement is also suited for carrying greater line weights. They also impart to the line guiding arrangement higher flexural and torsional strength.

The fact that the line guiding arrangement consists of two parallel strands that are interconnected by crossbars, makes it simple to adapt the line guiding arrangement to different tasks. By varying the length of the crossbars, it is possible to make available differently wide line guiding arrangements, without requiring a modification of the strands. The crossbars may also be provided with partition systems, so as to obtain a better utilization of the cross section of the guide channel.

For purposes of further increasing the flexural and the torsional strength of the line guiding arrangement it is proposed that at least one strand is made at least in part of a plurality of side-by-side strand sections.

Preferably, each of the strands comprises a support wall portion projecting substantially laterally from the side wall portion, with the separations continuing through the side wall portion to at least the vicinity of the support wall portion. This preferred configuration of the line guiding arrangement makes it possible to obtain a wider support surface of the line guiding arrangement. This will be especially advantageous, when the upper half of the line guiding arrangement slides on the lower half thereof.

According to yet a further advantageous configuration of the line guiding arrangement, it is proposed to provide each strand with a cover wall portion and a support wall portion. The cover wall portion and support wall portion project substantially laterally from the side wall portion. The transverse separations extend through the cover wall portion, and they continue in the side wall portion to at least the vicinity of the support wall portion. Such a strand may also be described as a C-shaped strand. This configuration permits imparting a greater stiffness to the individual segments of the line guiding arrangement. The support wall portion may also be used as a support surface for a crossbar. The same applies to the cover wall portion. In such an arrangement of the strand, the cover wall portion and the support wall portion extend into the guide channel.

According to yet a further advantageous configuration of the line guiding arrangement, it is proposed to provide each strand with a cover wall portion, a support wall portion, and a bottom wall portion, which project substantially laterally from the side wall portion and connect to the side wall portion. The transverse separations extend through the cover wall portion and continue in the side wall portion to at least the vicinity of the support wall portion, thereby forming the segments. In addition, cutouts may be provided, which extend upwardly through the bottom wall portion. The cutouts continue into the side wall portion to at least the vicinity of the support wall portion, thereby imparting to the strand limiters of the radius of curvature. Depending on the shape of the cutout, which may be, for example, inverted V-shaped, the tilting angle of adjacent segments is limited. Such a configuration of the strand imparts to the line guiding arrangement a greater stiffness. However, one may do without additional limiters of the radius of curvature.

According to yet a further advantageous configuration of the invention, it is proposed to make at least one strand at least in part as a hollow sectional strand. A particularly high stiffness of the line guiding arrangement is realized when each strand is made as a hollow sectional strand.

Preferred is a configuration of a hollow sectional strand, which comprises a support wall portion and a bottom wall portion, with the side wall portion extending to the bottom portion. Cutouts are provided in the hollow sectional strand. They extend through the bottom wall portion, and continue in the side wall portion to at least the vicinity of the support wall portion, thereby providing the hollow sectional strand with limiters of the radius of curvature.

According to yet a further advantageous configuration of the line guiding arrangement, it is proposed to construct the strand with a support wall portion formed between a cover wall portion and a bottom wall portion. This configuration of the strand is capable of absorbing relatively high forces.

Preferably, the hollow sectional strand as described above has a substantially rectangular cross section. Other cross sections may also be suited for constructing the line guiding arrangement. In particular, it is possible to influence the stiffness of the hollow section via the configuration of the cross section thereof.

Preferably, the crossbars are arranged in a region between the cover wall portion and the support wall portion. Especially advantageous is a configuration of the line guiding arrangement, wherein the crossbars extend below the support wall portion. This arrangement of the crossbars accomplishes that the lines lying on the crossbars extend substantially in the neutral phase of the line guiding arrangement. The neutral phase extends inside the support wall portion. As a result of running the lines substantially in the neutral phase, the lines are exposed only to a very slight mechanical stress.

To facilitate assembly, it is proposed in a further advantageous configuration of the line guiding arrangement that at least one crossbar lies with an end region against the cover wall and/or the support wall portion or bottom wall portion.

Preferably, the crossbars are releasably connected to the strands. The connection of the crossbars to the strands may occur, for example, by screws. Likewise, a form fitting or frictional engagement of a crossbar with a strand is possible.

Preferably, the side wall portions comprise passage openings. The passage openings serve to pass therethrough a mounting element that connects a crossbar to a sidewall portion of a segment. The passage openings may be arranged in selected segments or in all segments. The passage openings may be obtained by drilling.

According to yet a further advantageous configuration of the invention, it is proposed to provide on the side wall portions of selected segments or all segments adapters for securing a crossbar. The adapters may be releasably or permanently connected to the side wall portions of the segments. The use of different adapters permits using different crossbars even when the strands are similarly shaped.

To ensure that no objects, dirt particles, or the like enter the guide channel of the line guiding arrangement, the line guiding arrangement may be provided with at least one flexible cover that extends in the longitudinal direction of the line guiding arrangement. The cover also increases the safety of the line guiding arrangement, since it prevents at least in part having one reaching into the line guiding arrangement. To secure the cover, it is proposed in an advantageous configuration of the line guiding arrangement to provide each strand with a slot extending in the longitudinal direction of the line guiding arrangement. This slot extends into an edge region of the cover. The cover may consist of plastic, or a metallic material.

BRIEF DESCRIPTION OF THE DRAWINGS

Further details and advantages of the line guiding arrangement according to the invention are described in more detail with reference to embodiments illustrated in the drawing, in which.

DETAILED DESCRIPTION OF THE PREFERRED EMBODIMENTS

Figure 1:
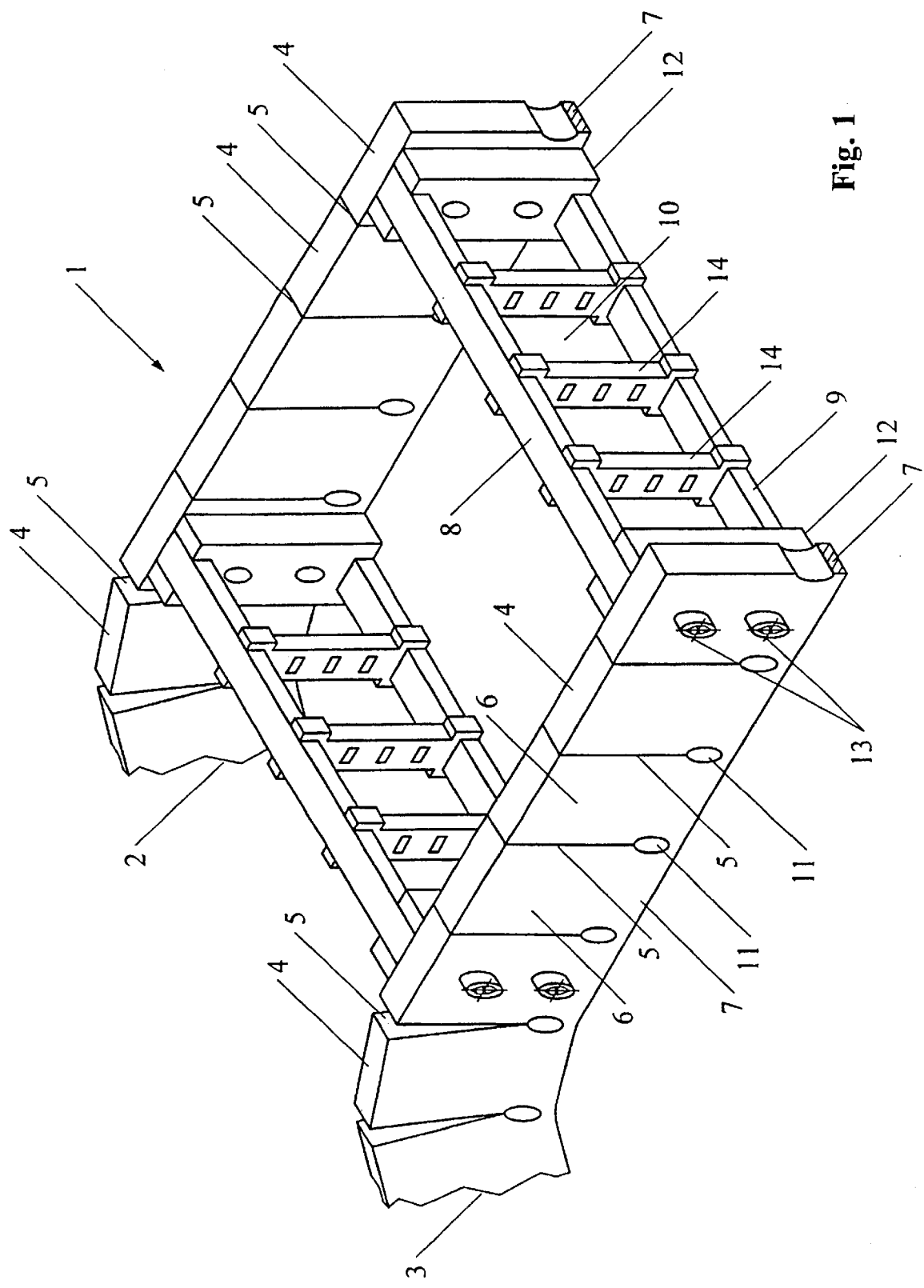
FIG. 1 is a schematic and perspective view of a first embodiment of a line guiding arrangement.

FIG. 1 is a perspective view of a first embodiment of a line guiding arrangement 1, which is suitable for running at least one energy line. For the sake of a better overview, FIG. 1 does not show the energy line.

The line guiding arrangement 1 comprises two substantially parallel longitudinally extending strands 2, 3. Each strand 2, 3 is made in one piece of an extruded strand of a plastic.

Each strand 2, 3 is subdivided by transverse separations 5 into segments 4. The transverse separations 5 extend substantially vertically as illustrated, and they are formed at selected longitudinally spaced apart intervals. The transverse separations 5 extend in the side wall portions 6 to the vicinity of a support wall portion 7. As can be noted from the illustration in FIG. 1, the transverse separations 5 merge into generally circular cutouts 11. The circular cutouts 11 reduce stress in the region of the bending axes.

The strand 2 and strand 3 are interconnected by means of crossbars 8, 9. The crossbars 8, 9 are attached at selected intervals between one another to respective segments 4. To attach each crossbar 8, 9, adapters 12 are provided. The adapters 12 are connected by means of mounting elements 13 to the respective side wall portion 6 of a segment 4. Each adapter 12 has in its respective end region a recess. The recesses are adapted to receive crossbars 8, 9. By twisting the crossbars 8, 9 about their longitudinal axis, the crossbars 8, 9 are secured in the adapters 12.

The segments 4 as well as crossbars 8, 9 define a guide channel 10 which has a substantially rectangular cross section. In the guide channel 10, lines may be inserted. To subdivide a plurality of lines into individual lines or into groups of lines, transverse or vertical partitions 14 are provided between the crossbars 8, 9. The partitions 14 extend substantially transverse to crossbars 8, 9, and should it be found useful, it is possible to provide further partitions which extend substantially parallel to crossbars 8, 9 and connect to the partitions 14 shown in FIG. 1. Both the crossbars 8, 9 and the partitions 14, as well as further partitions, if need be, form a partition system, which may be formed irrespective of the configuration of strands 2, 3. The configuration of the line guiding arrangement permits realizing different subdivisions of guide channel 10. It is not absolutely necessary to adapt the strands 2, 3 to the different partition systems.

Figure 2:
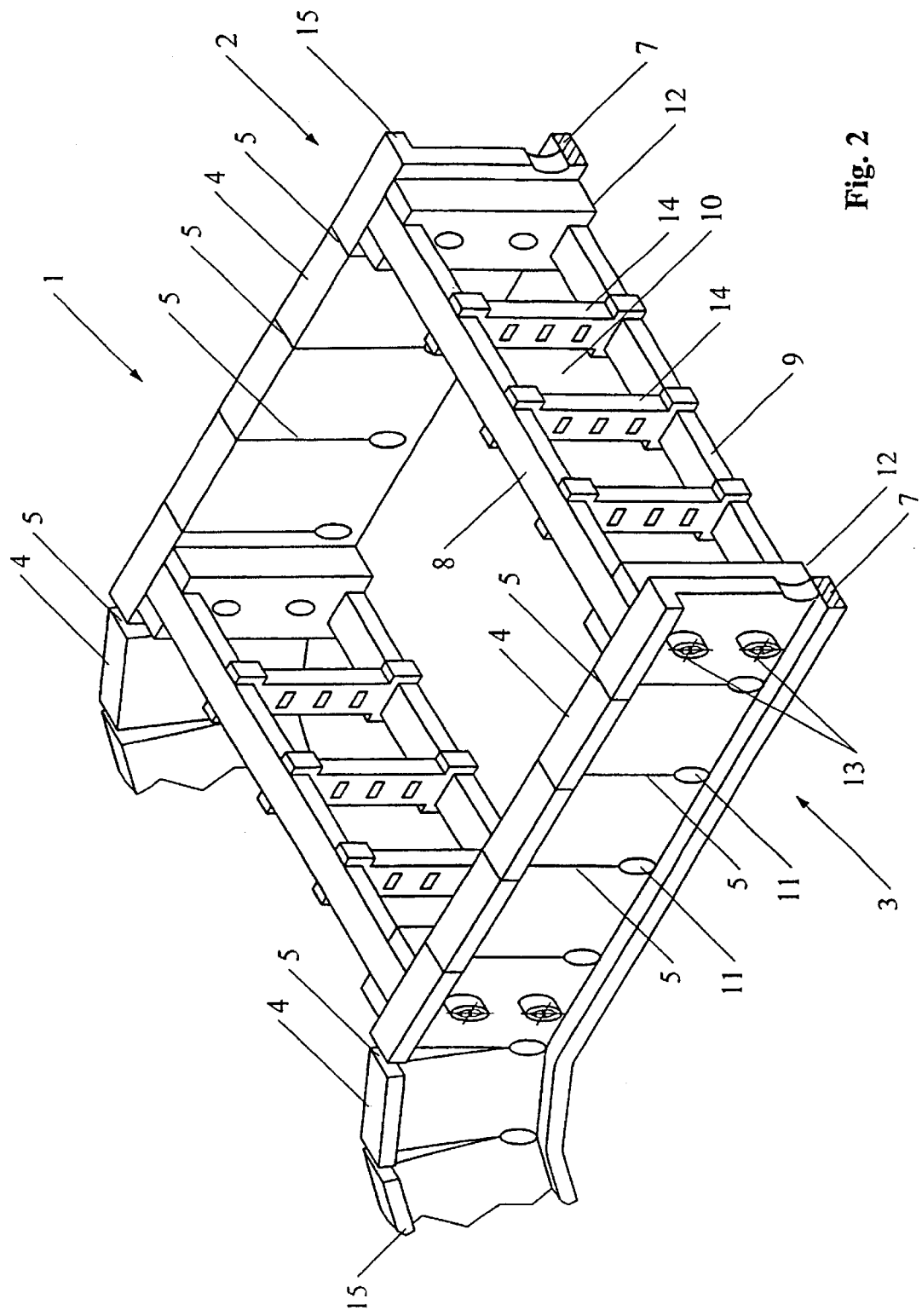
FIG. 2 is a perspective view of a second embodiment of a line guiding arrangement.

FIG. 2 illustrates a second embodiment of a line guiding arrangement which is a variation of the line guiding arrangement shown in FIG. 1.

The line guiding arrangement 1 of FIG. 2 comprises two substantially parallel extending strands 2, 3. The strands 2, 3 are made as sectional strands. The sectional strands 2, 3 comprise a support wall portion 7 that projects substantially laterally from the side wall portion 6. The transverse separations 5, which subdivide the strand 2 and strand 3 respectively into a strand with segments 4, extend through the side wall portion 6 of the respective strand 2, 3 to the support wall portion 7. Likewise in the line guiding arrangement of FIG. 2, the transverse separations 5 merge into substantially circular cutouts 11 in the vicinity of support wall portion 7.

The strands 2, 3 of line guiding arrangement 1 as shown in FIG. 2 also comprise a cover wall portion 15, which extends substantially laterally to the side wall portion 6. The support wall portion 7 and the cover wall portion 15 extend substantially parallel to each other, and in the same direction, so as to form a C-shaped cross section. Other cross sectional shapes, in particular T-shaped, I-shaped, or Z-shaped configurations are possible. Variations of these cross sectional configurations are likewise possible.

Likewise, the cover wall portion 15 is divided by the transverse separations 5. In the embodiment illustrated in FIG. 2, the support wall portion 7 and the cover wall portion 15 are directed outward. The support wall portion 7 and the cover wall portion 15 form a protective cover for the mounting elements 13. The mounting elements 13 serve to secure adapters 12 to the respective strands. The adapters 12 connect to crossbars 8, 9, and between crossbars 8, 9, the partitions 14 extend.

Figure 3:
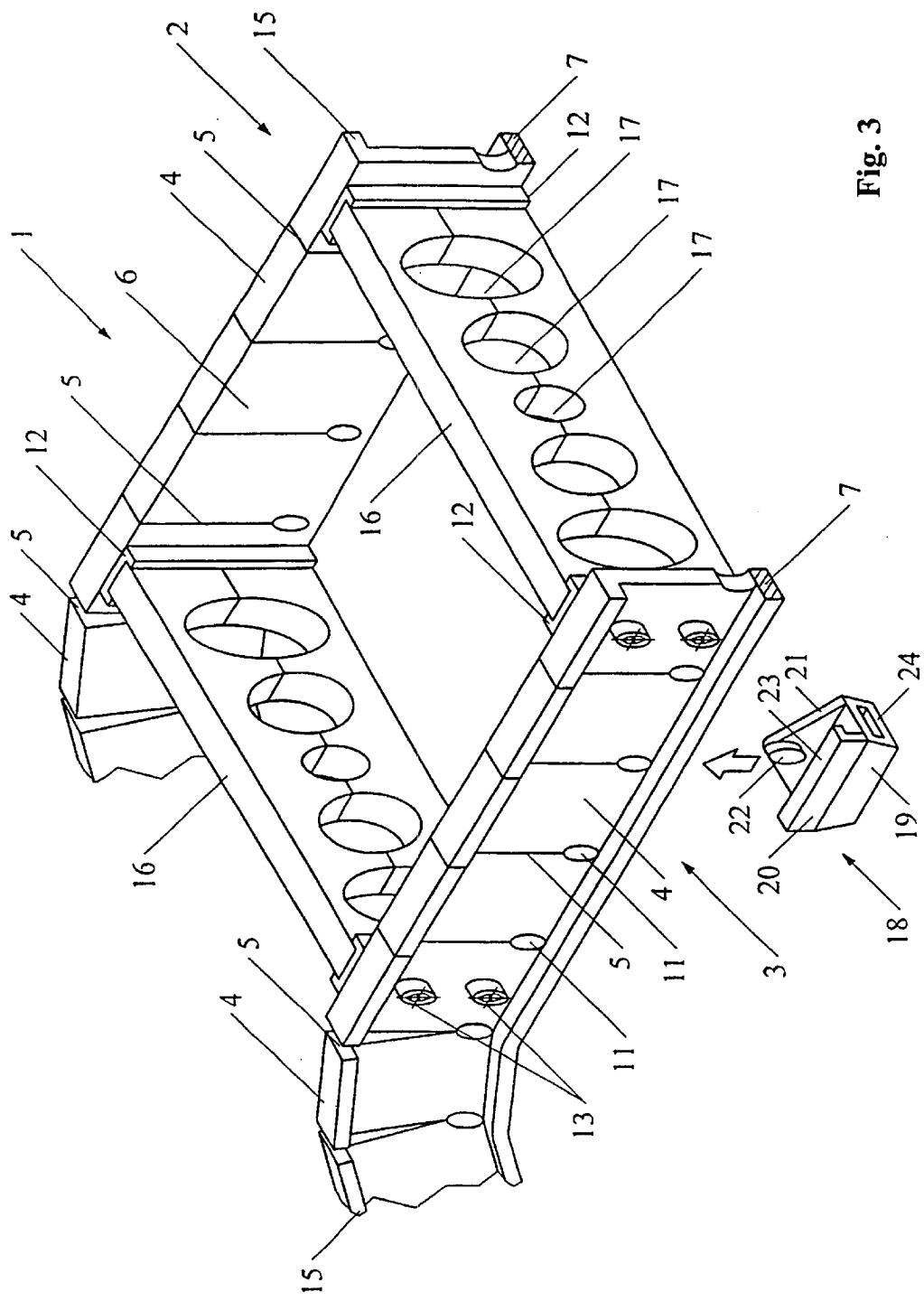
FIG. 3 is a perspective view of a third embodiment of a line guiding arrangement.

FIG. 3 illustrates a further embodiment of a line guiding arrangement. The strands 2, 3 of the line guiding arrangement of FIG. 3 are constructed in the same way as the strands 2, 3 of line guiding arrangement 1 of FIG. 2. Therefore, the description of FIG. 2 is herewith incorporated by reference.

Between the strands 2, 3, plate-like crossbars 16 extend. The crossbars 16 contain holes 17, through which the lines extend. Each crossbar 16 is made in two pieces. At selected intervals between one another, the crossbars 16 are mounted for adjustment on the respective segments. For mounting each crossbar 16, adapters 12 are provided, which are connected by means of mounting elements 13 to the respective segment 4. In the illustrated embodiment, the adapters 12 are U-shaped brackets.

To limit a radius of curvature in the region of the loop formation of the line guiding arrangement, it is possible to arrange on each strand 2, 3 a plurality of flexure limiting elements 18, in an end-to-end arrangement along the support wall portion 7. Each limiting element 18 comprises a base body 19 which is trapezoidal in cross section, and which comprises oppositely formed stop surfaces 24. From the base body 19, a sidebar 21 extends, which mounts a head 22. In spaced relationship from sidebar 21, a further sidebar 20 is provided. The sidebar 20 comprises a lateral projection 23 opposite to the head 22. The spacing between lateral projection 23 and a surface of base body 19 corresponds substantially to the thickness of the support wall portion 7. Thickness of the support wall portion 7 means the dimension of the support wall portion 7 transverse of the longitudinal direction of the line guiding arrangement.

Each limiting element 18 is secured to a strand in that the head 22 engages in a cutout 11. The lateral projection 23 lies against the support wall portion 7. The side wall portion 6 extends between sidebars 20, 21. A predetermined inclination of the stop surfaces permits adjustment of different tilting angles of adjacent segments 4, by controlling the engagement between adjacent elements 18.

Figure 4:
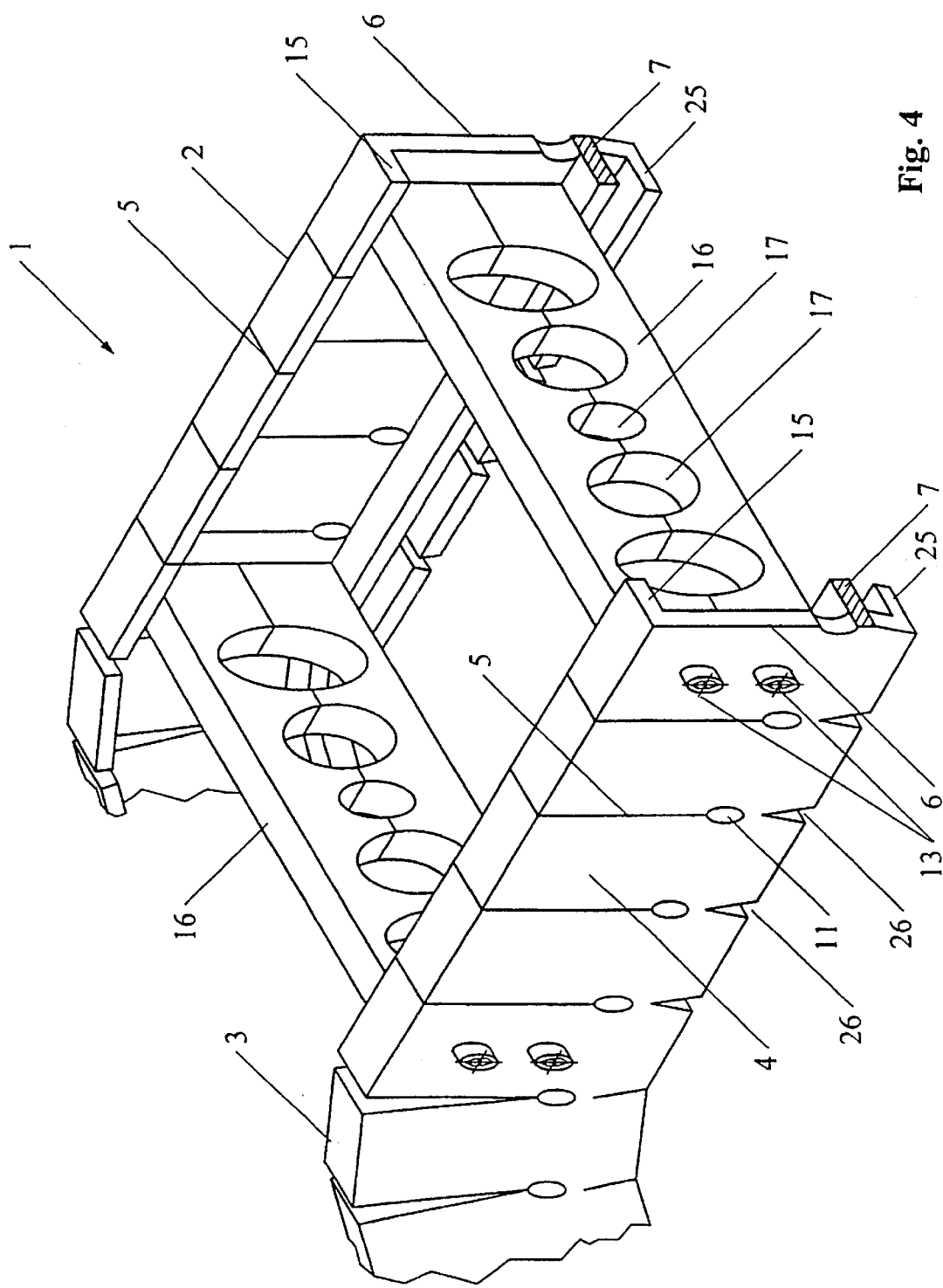
FIG. 4 shows a further embodiment of a line guiding arrangement with integrated limiters of the radius of curvature.

FIG. 4 shows a further embodiment of a line guiding arrangement 1. The line guiding arrangement 1 comprises two substantially parallel extending strands 2, 3. Each strand 2, 3 comprises a plurality of segments 4. The segments 4 are separated from one another by transverse separations 5.

Each strand 2, 3 is made in the form of a sectional strand. Each strand 2, 3 comprises a cover wall portion 15, a support wall portion 7, and a bottom wall portion 25. The transverse separations 5 extend through the cover wall portion 15 and continue in the side wall portion to at least the vicinity of the support wall portion 7. The transverse separations 5 widen into cutouts 11 with a circular cross section, as has been previously described. Each strand 2, 3 comprises cutouts 26, which extend through the bottom wall portion 25. The cutouts 26 continue in the side wall portions 6 to the vicinity of support wall portion 7. In the illustrated embodiment, the cutouts 26 are inverted V-shaped and narrow from the bottom wall portion 25 toward the support wall portion 7. The angle, at which the cutouts 26 narrow toward support wall 7, defines the tilting angle of adjacent segments 4. The tilting angle of adjacent segments 4 defines likewise the radius of curvature of the line guiding arrangement. Each strand 2, 3 is thus constructed with integrated limiters of the radius of curvature.

As shown in FIG. 4, the cover wall portions 15, support wall portions 7, as well as the bottom wall portions 25 extend laterally in the same direction, i.e. toward the opposite strand. Between the cover wall portions 15 and the support wall portions 7, plate-like crossbars 16 extend. In the illustrated embodiment, the crossbars are perforated with holes 17 for receiving lines. Each crossbar 16 is secured by means of connecting elements 13 directly to the side wall portions 6 of the respective segments 4. Preferably, the height of crossbar 16 is somewhat greater than the spacing between the cover wall portions 15 and support wall portions 7 of strands 2, 3, so that the crossbar 16 can be inserted with a press fit between the cover wall portions 15 and the support wall portions 7. This facilitates assembly of crossbar 16, since the crossbar 16 is held by support wall portion 7 and cover wall portion 15 of strand 2 and strand 3 respectively. Subsequently, the cross bar 16 may be secured by mounting members 13.

Figure 5:
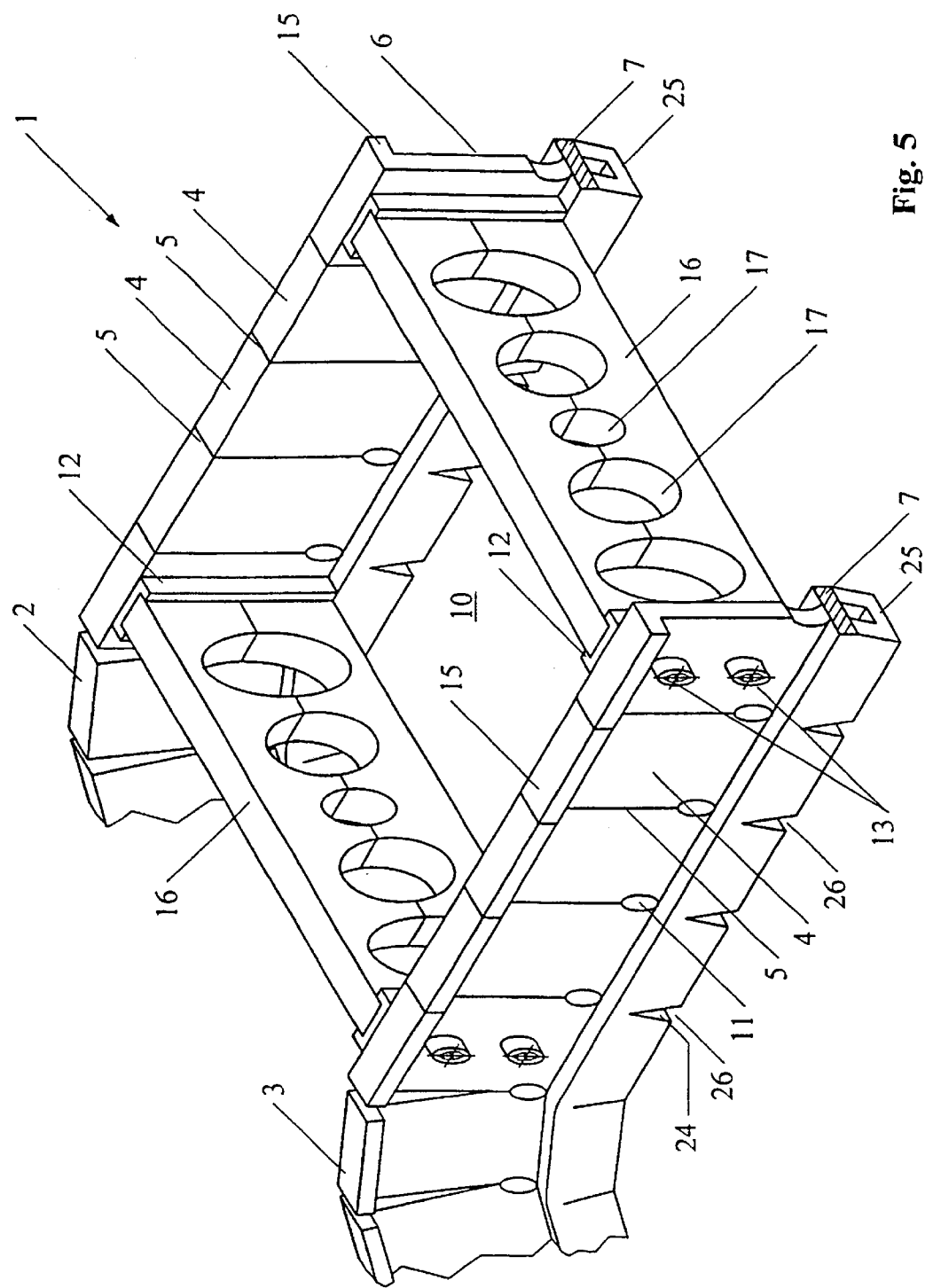
FIG. 5 shows a further embodiment of a line guiding arrangement with strands that are made in part as hollow sections.

FIG. 5 illustrates a further embodiment of a line guiding arrangement 1, which may be used to run at least one line in a guide channel 10. The line guiding arrangement comprises two substantially parallel onepiece strands 2, 3. Transverse separations 5 subdivide each strand 2, 3 into a strand 2, 3 with segments 4. In the illustrated embodiment, the strand 2 and the strand 3 are made at least in part as a hollow sectional strand. The hollow sectional strand comprises a support wall portion 7 and a U-shaped bottom wall portion 25. The side wall portions 6 extend right to the bottom wall portion 25. In the illustrated embodiment, the portion of strand 2, 3 that is made as a hollow sectional strand, is substantially rectangular, and the side wall portion 6 extends from the hollow section. The side wall portion 6 includes a cover wall portion 15. As can be noted from FIG. 5, the side wall portion 6 is aligned substantially in the center of the hollow section.

The strands 2, 3 are interconnected by the plate-like crossbars 16. The crossbars 16 are arranged relative to one another in preselected segments. In the illustrated embodiment, the crossbar 16 is perforated with holes 17. Other crossbar arrangements are likewise possible. The crossbar 16 connects by means of adapters 12 to the strands 2, 3. The crossbar 16 lies against the support wall portion 7 of strand 2 and 3 respectively. As a result of forming each strand 2, 3 at least in part as a hollow section, the line guiding arrangement is imparted an increased strength, in particular torsional strength.

The line guiding arrangement 1 is constructed with integrated limiters of the radius of curvature. The limiters of the radius of curvature are formed by the segments of the hollow sectional strand of strands 2, 3. As shown in FIG. 5, inverted V-shaped cutouts 26 that narrow toward the support wall portion 7, extend through the bottom wall portion 25 to the vicinity of the support wall portion 7. The opposite surfaces of the cutouts 26 form stop surfaces 24 for limiting the tilting angle of adjacent segments. The cutouts 26 are substantially aligned with the transverse separations 5.

Figure 6:
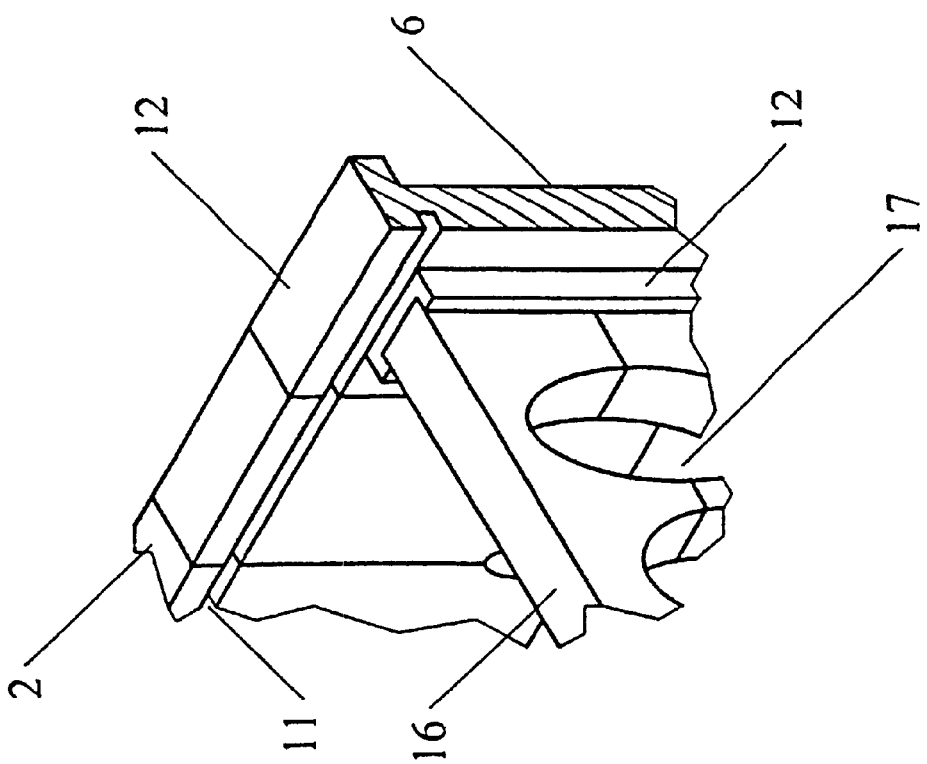
FIG. 6 is an enlarged detail view of the line guiding arrangement of FIG. 5.

To cover the guide channel 10 at least one cover may be provided. Preferably, the cover consists of a flexible band that extends in the longitudinal direction of the line guiding arrangement. To secure the cover to the line guiding arrangement, strand 2 is provided with slots 27 that extend in the longitudinal direction of the line guiding arrangement. The slots 27 are formed above or below crossbar 16, as shown in FIG. 6. Preferably, the strand 2 is provided with two spaced slots, so that two covers may be provided, between which the crossbars 16 extend. Likewise, strand 3 is formed in a corresponding manner.

Figure 7:
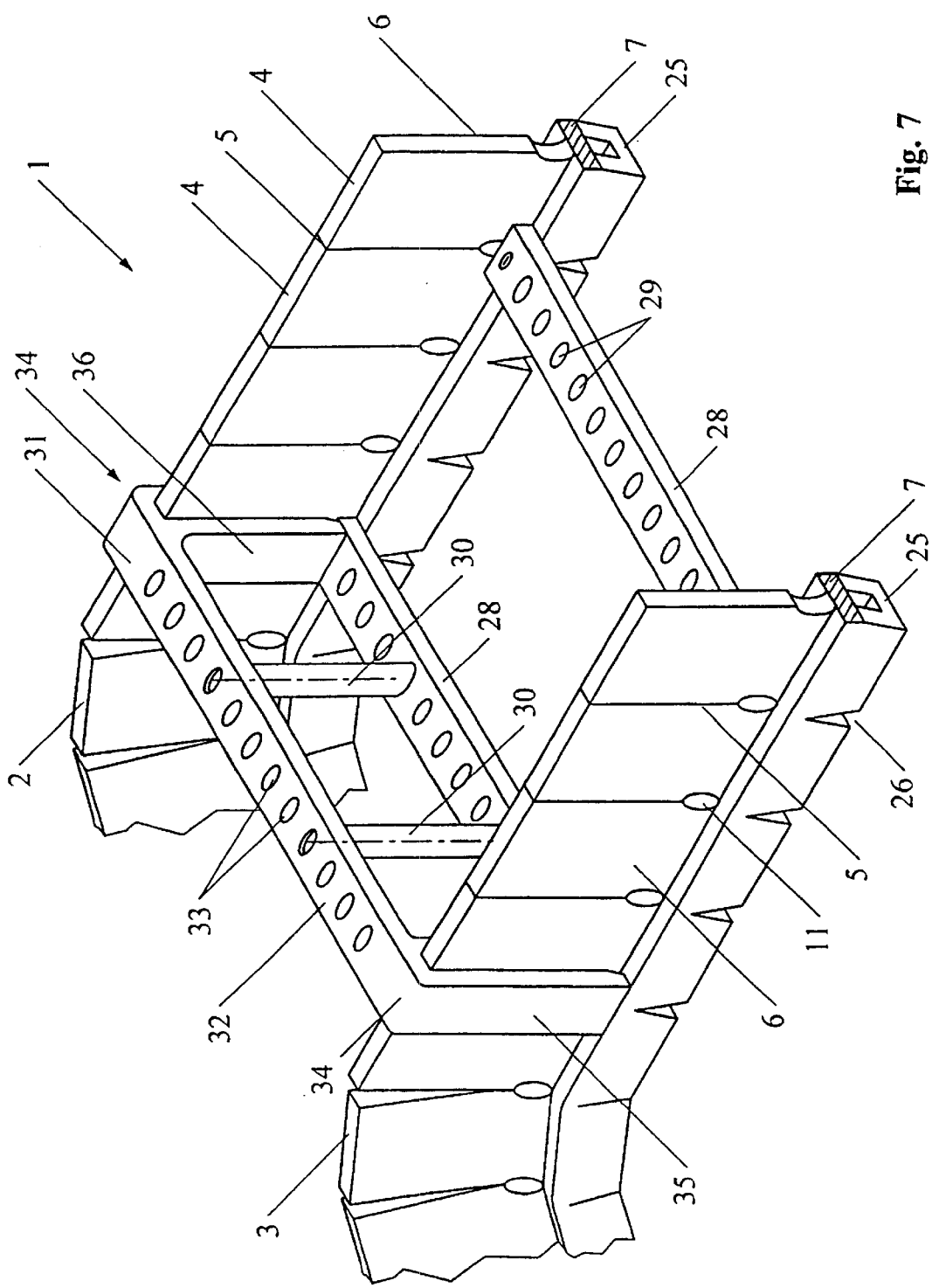
FIG. 7 is a perspective view of a further embodiment of a line guiding arrangement.

FIG. 7 shows a further embodiment of a line guiding arrangement. The line guiding arrangement is formed by strands 2, 3. The strands 2, 3 are in part made as hollow sectional strands. The basic construction of strands 2, 3 corresponds to the construction of strands 2, 3 of FIG. 5. In the embodiment of FIG. 7, each strand 2, 3 has no cover wall portion, so that the segments 4 are formed on the hollow section in the fashion of ribs.

The strands 2, 3 are interconnected by crossbars 28. Preferably, the crossbars 28 are permanently connected onto the shoulders formed by the laterally extending support wall portions 7 of the strands 2, 3. In particular, the crossbars 28 may be connected to strands 2, 3 by gluing or welding. In this connection, the crossbars 28 also consist of plastic for purposes of welding, so that a welding of plastic occurs.

The crossbars 28 are arranged in the region of transverse separations 5. The crossbars 28 have bores 29, into which partitions 30 extend with an end section. The strands 2, 3 are also interconnected by crossbars 31 that are constructed in the fashion of a clip. The crossbars 31 comprise a section 32 that is positioned above crossbar 28. The section 32 has bores 33 that correspond with bores 29, so that the partitions 30 are arranged between crossbars 28, 31 and secured by same.

Adjacent the ends of the section 32 are engagement means 34. Each engagement means 34 is formed by an outer sidebar 35 and an inner sidebar 36. The outer sidebar 35 and the inner sidebar 36 extend substantially parallel to each other. The spacing between the outer sidebar 35 and the inner sidebar 36 is dimensioned such as to permit insertion of a segment of a side wall portion 6.

To secure crossbar 31 to strand 2 and strand 3 respectively, the outer sidebar 35 and/or the inner sidebar 36 of the respective engagement means 34 comprise a projection (not shown), which extends into cutout 11. This form fitting connection between crossbar 31 and strand 2 as well as strand 3 ensures that during the operation of the line guiding arrangement, the crossbar 31 is safely connected to the line guiding arrangement. The extension of crossbar 31 in the longitudinal direction of the line guiding arrangement is greater than the gap forming between adjacent segments 4 in the maximally tilted state of the line guiding arrangement.

Figure 8:
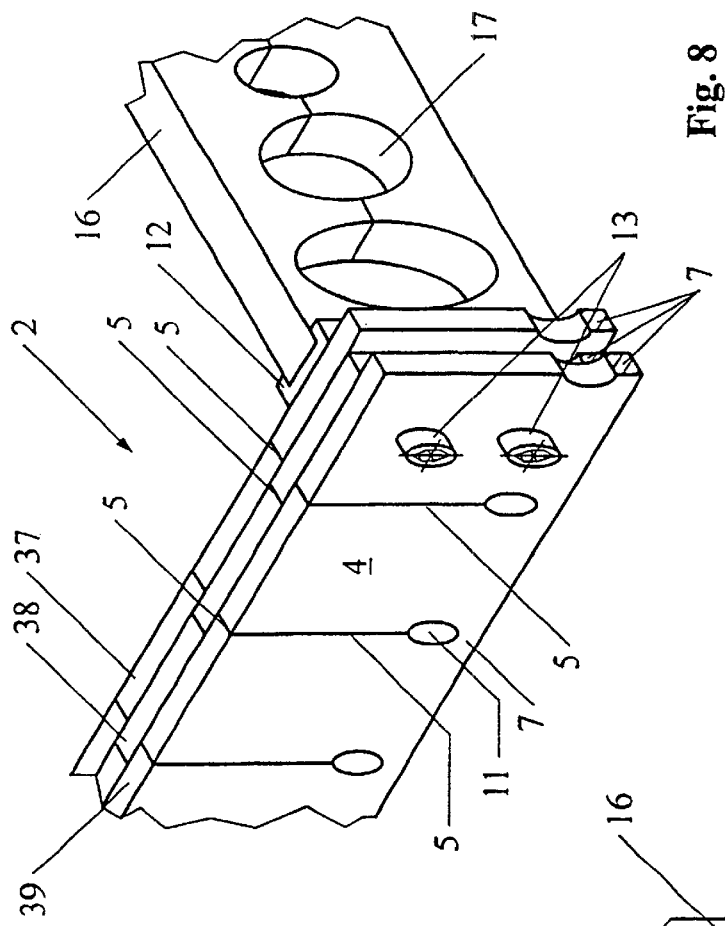
FIG. 8 is a schematic and perspective view of a further embodiment of a line guiding arrangement.
Figure 9:
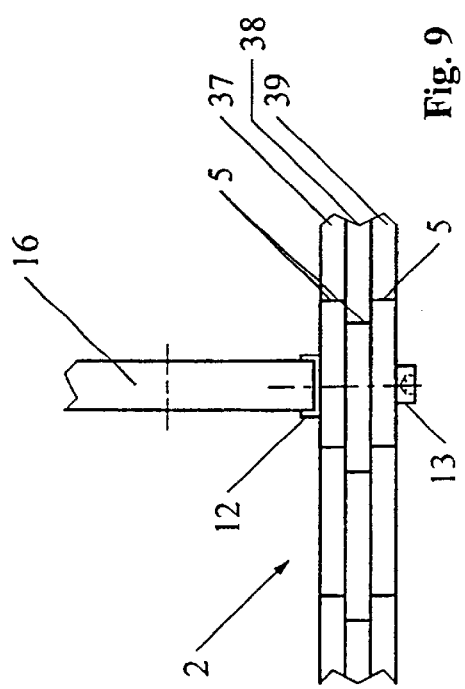
FIG. 9 is a partial view from top of the line guiding arrangement of FIG. 8.

FIGS. 8 and 9 show a further embodiment of a line guiding arrangement. The line guiding arrangement is formed by strands, with FIGS. 8 and 9 showing only one strand 2. The further strand of the line guiding arrangement may be constructed in a corresponding manner. In the illustrated embodiment, the strand 2 is formed by three side-by-side strand sections 37, 38, 39. Each strand section 37, 38, 39 is subdivided by transverse separations 5 into segments 4. The transverse separations 5 in strand sections 37, 38, 39 are offset from one another. In the illustrated embodiment, the transverse separations 5 of strand sections 37, 39 are in alignment with one another, thereby accomplishing a greater stiffness of strand 2. The strand 2 may also be formed by only two side by side strand sections. Likewise possible are more than three strand sections. The offset of the transverse separations from one another also prevents a risk of damage to the line guiding arrangement.

Many modifications and other embodiments of the invention will come to mind to one skilled in the art to which this That which is claimed:

1. A line guiding arrangement for supporting at least one running line from an attachment point to a movable consumer load, comprising
   a pair of substantially parallel strands which extend in a longitudinal direction, with each strand comprising a side wall portion and a support wall portion extending along a lower edge of the side wall portion, and a plurality of separations extending transversely to the longitudinal direction and spaced at selected longitudinal intervals from one another, and with the separations each extending from an upper edge of the side wall portion through the side wall portion to a point adjacent the support wall portion, and so as to define a plurality of flexibly interconnected segments between the separations in each strand, and
   a plurality of crossbars connected between the pair of strands at selected longitudinal intervals, wherein the pair of strands are interconnected solely by the crossbars, and wherein the pair of strands and the crossbars define a longitudinal guide channel for supporting at least one running line.

2. The line guiding arrangement as defined in claim 1 wherein each of the strands is fabricated from plastic.

3. The line guiding arrangement as defined in claim 2, wherein at least one of the strands comprises a plurality of side by side strand sections.

4. The line guiding arrangement as defined in claim 3 wherein each of the strand sections includes the transversely extending separations, with the separations of adjacent strand sections being longitudinally offset from each other.

5. The line guiding arrangement as defined in claim 1 wherein the support wall portion of each strand projects in a lateral direction from the side wall portion.

6. The line guiding arrangement as defined in claim 5 wherein each strand further comprises a cover wall portion extending along the upper edge of the side wall portion, with the cover wall portion projecting in a lateral direction from the side wall portion, and with the transverse separations extending through the cover wall portion.

7. The line guiding arrangement as defined in claim 6 wherein each strand further comprises a bottom wall portion which projects laterally from the side wall portion, with the bottom wall portion extending along a lower edge of the support wall portion.

8. The line guiding arrangement as defined in claim 7 wherein each strand further comprises a plurality of cutouts extending upwardly through the bottom wall portion at selected longitudinal intervals from one another.

9. The line guiding arrangement as defined in claim 8 wherein the cutouts are of inverted V-shape and are transversely aligned with respective ones of the separations.

10. The line guiding arrangement as defined in claim 9 wherein the bottom wall portion of each strand comprises a hollow sectional member.

11. The line guiding arrangement as defined in claim 6 wherein the crossbars are arranged in a region between the cover wall portion and the support wall portion.

12. The line guiding arrangement as defined in claim 1 wherein the crossbars are releasably connected to each of the strands.

13. The line guiding arrangement as defined in claim 1 further comprising at least one slot extending longitudinally along the upper edge of the side wall portion for receiving an end of a crossbar therein.

14. The line guiding arrangement as defined in claim 1 wherein the separations each terminate in a cutout of generally circular outline which extends through the side wall portion at a location adjacent the support wall portion.

15. The line guiding arrangement as defined in claim 1 further comprising adapters mounted to selected ones of the segments for securing an end of a crossbar thereto.

16. The line guiding arrangement as defined in claim 1 wherein the flexibly interconnected segments define a tilting angle between adjacent segments, and wherein each strand further comprises a bottom wall portion which is positioned on the side of support wall portion opposite the side wall portion, and a plurality of cutouts of inverted V-shaped cross section formed in the bottom wall portion at selected longitudinal intervals, and such that the opposite surfaces of the V-shaped cutouts form stop surfaces for limiting the tilting angle of adjacent segments.

17. The line guiding arrangement as defined in claim 1 further comprising a plurality of flexure limiting members mounted in a longitudinal end-to-end arrangement along the support wall portion of at least one of the strands.

18. The line guiding arrangement as defined in claim 1 wherein at least some of the crossbars comprise upper and lower parallel members, with vertical partitions extending therebetween.

19. The line guiding arrangement as defined in claim 1 wherein at least some of the crossbars comprise plate-like members with openings extending therethrough.

20. The line guide arrangement as defined in claim 1 wherein at least some of the crossbars comprise upper and lower parallel members which are configured so that the longitudinal guide channel is completely enclosed by the upper and lower parallel members and the pair of strands.

21. A line guiding arrangement for supporting at least one running line from an attachment point to a movable consumer load, comprising
   a pair of substantially parallel strands which extend in a longitudinal direction, with each strand comprising a side wall portion and a support wall portion extending along a lower edge of the side wall portion, and a plurality of separations extending transversely to the longitudinal direction and spaced at selected longitudinal intervals from one another, and with the separations each extending from an upper edge of the side wall portion through the side wall portion to a point adjacent the support wall portion, and so as to define a plurality of flexibly interconnected segments between the separations in each strand, and
   a plurality of crossbars connected between the pair of strands at selected longitudinal intervals, wherein the pair of strands and the cross bars define a longitudinal guide channel for supporting at least one running line, and wherein at least some of the crossbars comprise upper and lower parallel members, with vertical partitions extending therebetween.

* * * * *